United States Patent
Kurio et al.

[11] 3,796,436
[45] Mar. 12, 1974

[54] OIL SEAL DEVICE FOR ROTARY PISTON INTERNAL COMBUSTION ENGINE

[75] Inventors: Noriyuki Kurio, Hiroshima; Hiroshi Minegishi, Kawaguchi, both of Japan

[73] Assignees: Toyo Kogyo Co., Ltd., Hiroshima; Nippon Piston Ring, Co., Ltd., Tokyo, both of, Japan

[22] Filed: Oct. 6, 1972

[21] Appl. No.: 295,782

[30] Foreign Application Priority Data
Oct. 8, 1971  Japan.............................. 46-78636

[52] U.S. Cl. ................. 277/81 P, 277/86, 418/142
[51] Int. Cl. ............................................. F16j 15/34
[58] Field of Search ......... 277/81 R, 81 P, 81 S, 86, 277/87; 418/142

[56] References Cited
UNITED STATES PATENTS

| | | | |
|---|---|---|---|
| 2,419,588 | 4/1947 | Pasco | 277/86 |
| 2,963,306 | 12/1960 | Tracy | 277/86 |
| 3,129,949 | 4/1964 | Laux | 277/86 |
| 3,535,061 | 10/1970 | Yamamoto | 418/142 |
| 3,575,541 | 4/1971 | Hamada | 277/81 P |

*Primary Examiner*—Louis R. Prince
*Assistant Examiner*—Robert I. Smith
*Attorney, Agent, or Firm*—Sughrue, Rothwell, Mion, Zinn and Macpeak

[57] ABSTRACT

In a rotary piston internal combustion engine comprising a center housing having a trochoidal inner peripheral surface, side housings provided at both sides of said center housing, a three apexed rotary piston is provided through an eccentric shaft within a casing formed by said center and side housings. An oil seal device is disposed in an annular groove formed on a thrust surface of the rotary piston including an oil seal ring having an annular recess or an annular step on the rear portion thereof. A U-shaped elastic seal ring is disposed in said annular recess or step and has two lips slidably and sealingly contacting at least one radially facing surface of said annular recess, said annular step or said annular groove, and a spring is disposed between said oil seal ring and said U-shaped elastic seal ring for pressing said oil seal ring and said U-shaped elastic sealing in opposite axial directions.

16 Claims, 5 Drawing Figures

PATENTED MAR 12 1974

3,796,436

OIL SEAL DEVICE FOR ROTARY PISTON INTERNAL COMBUSTION ENGINE

BACKGROUND OF THE INVENTION

1. Field of the Invention

This invention relates to improvements of an oil seal device of a rotary piston internal combustion engine which is fitted onto the thrust surface of a rotary piston so as to maintain oil tightness between the thrust surface of the rotary piston and a side housing, and more particularly an improved auxiliary seal ring for maintaining sealing between the oil seal ring disposed in the annular groove provided on the thrust surface of a rotary piston and for maintaining an oil tightness between the thrust surface of a rotary piston and the inner surface of the side housing and an annular groove.

2. Description of the Prior Art

Generally, the oil seal device of a rotary piston engine includes an oil seal ring disposed in the annular groove of a thrust surface of a rotary piston for preventing oil from leaking between the thrust surface of a rotary piston and the inner surface of a side housing. A spring presses the oil seal ring onto the inner surface of a side housing, and an auxiliary seal ring for sealing between the radially facing surface of an annular groove and the radially facing surface of an oil seal ring for maintaining oil tightness between the oil seal ring and the annular groove. This auxiliary seal ring comprises a resilient auxiliary seal ring disposed in an annular recess provided on either the radially facing surface of an annular groove or the radially facing surface of an oil seal ring.

The oil seal device of this type has the following disadvantages: The resilient auxiliary seal ring has a requirement to be pressed sealingly on two radially facing surfaces for maintaining a sealing between the radially facing surface of an annular groove and the radially facing surface of an oil seal ring. This auxiliary seal ring has the effect of maintaining oil tightness between the annular groove of a thrust surface and the oil seal, but reduces the effect to maintain an oil tightness between the inner surface of the side housing and the thrust surface of the rotary piston by the oil seal ring as a result of the oil seal ring being depressed by the spring on the inner surface of the side housing. That is, it has the disadvantage to lower the followability of an oil seal ring to the inner surface of a side housing by the friction between the radially facing surface of an auxiliary seal ring and an oil seal ring or the radially facing surface of an auxiliary seal ring or an annular groove.

In the oil seal device of this type of the rotary piston engine, the oil seal ring and the auxiliary seal ring move very complicatedly by the peculiar movement of the rotary piston of a rotary piston engine. That is, the oil seal ring and the auxiliary seal ring move in radial and peripheral direction of the seal ring together with the eccentric rotary motion of the rotary piston. Since the oil seal ring must be pressed onto the inner surface of the side housing, it can move in the vertical direction to the inner surface of the side housing. In order that the oil seal ring moves in the direction vertical to the inner surface of the side housing, the auxiliary seal ring must also follow in the same direction as that, but since the auxiliary seal ring is pressed onto the radially facing surfaces of the annular groove and the oil seal ring, the followability thereof in the direction is very bad. The auxiliary seal ring moves very complicatedly as above, it has the disadvantages of being twisted and damaged during operation of the rotary piston engine.

The oil seal device disclosed in U. S. Pat. No. 3,506,275, assigned to the common assignee, has the following disadvantages: The oil seal ring is pressed onto the inner surface of the side housing by the spring through an auxiliary resilient seal ring. Since the auxiliary seal ring is resilient, the pressing force of the spring is absorbed by the auxiliary seal ring with the result that the followability of the oil seal ring to the side housing is poor and is a disadvantage. The rotary piston moves parallel with the side housing by the operation of the rotary piston engine. Therefore, the oil seal must also move in the same direction. Since the oil seal ring is pressed on the inner surface of the side housing by a spring through the auxiliary resilient seal ring, in order that the oil seal ring moves together with the movement of the rotary piston, parallel with the side housing, part of the auxiliary resilient seal ring disposed between the oil seal ring and the spring moves in the same direction. However, the other part of the auxiliary seal ring is disposed between the spring and the bottom of the annular groove and is strongly pressed on the bottom of the annular groove by the spring. Therefore, part of the auxiliary seal ring between the annular groove and the spring is prevented from moving in the same direction as that part of the auxiliary seal ring between the oil seal ring and the spring. Therefore, this auxiliary seal ring is twisted as a result. As a result, it has the disadvantages that the auxiliary seal ring is damaged and oil is leaked.

SUMMARY OF THE INVENTION

It is an object of the present invention to eliminate the above disadvantages of the conventional oil seal device and to provide novel and improved oil seal device for a rotary piston engine.

It is another object of the present invention to provide such a novel seal device where the oil seal ring may not be obstructed in movement by the auxiliary seal ring and the auxiliary seal ring may not be damaged so as to have an oil sealing effect for a long time.

Other objects and advantages of the present invention will be apparent from the following detailed description taken in conjunction with the accompanying drawings.

BRIEF DESCRIPTION OF THE DRAWINGS

In the drawings, the same numerals identify the same part of the devices.

DESCRIPTION OF THE PREFERRED EMBODIMENTS

Figure 1:
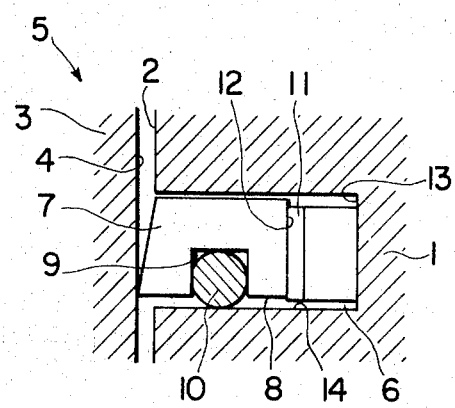
FIG. 1 is a sectional view of the conventional oil seal device of a rotary piston engine.

FIG. 1 shows a prior art oil seal device 5 of a rotary piston internal combustion engine (not shown) for maintaining oil tightness between the thrust surface 2 of a rotary piston 1 and the inner face 4 of the side housing 3. The oil seal device 5 is disposed in the annular groove 6 provided on the thrust surface 2 of the rotary piston 1. The oil seal ring 7 is provided with an annular recess 9 on the radially inwardly facing surface 8 thereof and has disposed therein an auxiliary resilient seal ring 10. A spring 11 is provided between the rear surface 12 of the oil seal ring 7 and the bottom 13 of the annular groove 6, and its spring 11 presses the oil seal ring 7 onto the inner surface 4 of the side housing 3. In the oil seal device 5, the auxiliary seal ring 10 is strongly pressed onto the radially outwardly facing surface 14 for maintaining a sealing between the inwardly facing surface 8 of the oil seal ring 7 and the radially outwardly facing surface 14 of the annular groove 6 as seen in the above description. Therefore, the followability of the oil seal ring 7, under the spring 12, to the inner face 4 of the side housing 3 is prevented by the friction between the auxiliary seal ring 10 and the radially outwardly facing surface 14. The outside portion of the auxiliary seal ring 7 tends to follow the inner surface 4 of the side housing 3 together with the oil seal ring 7 by the radially outside portion, and its radially inside portion does not follow in the same direction due to the friction of the annular groove 6. Therefore, the auxiliary seal ring is twisted and damaged during operation of the engine.

Figure 2:
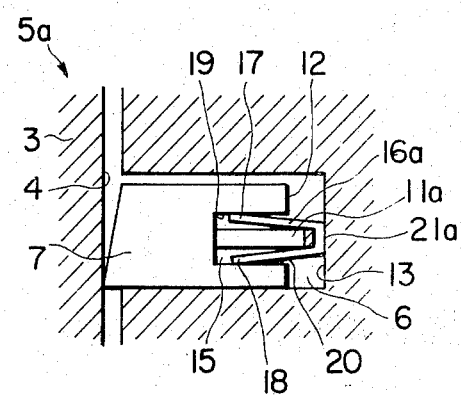
FIG. 2 is a sectional view of one embodiment of the oil seal device of the present invention.
Figure 3:
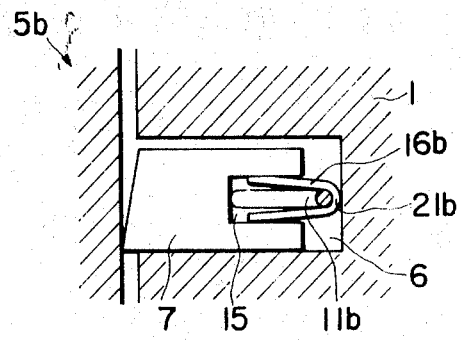
FIG. 3 is a sectional view of another embodiment of the oil seal device of the present invention.

FIGS. 2 and 3 show embodiments of the oil seal device of the present invention as at 5a and 5b. The oil seal ring 7 is provided with an annular recess 15 on the rear surface 12 thereof. U-shaped auxiliary seal ring 16a is disposed in the annular recess 15 to maintain sealing between the oil seal ring 7 and the annular groove 6. U-shaped auxiliary seal ring 16a has lips 17 and 18 sealbly and slidingly in contact with the radially inwardly and outwardly facing surfaces 19 and 20 of the annular recess 15. A wavy spring 11a is so disposed in the annular recess 15 as to press the bottom portion 21a of the U-shaped auxiliary seal ring 16a onto the bottom 13 of the annular groove 6 together with pressing the oil seal ring 7 onto the inner surface 4 of the side housing 3.

Since the oil seal device of the present invention is thus constructed, the followability of the oil seal ring 7 to the inner surface 4 of the side housing 3 is very well achieved without obstructing the axial movement of the oil seal ring 7 by the auxiliary seal ring 16a to provide a good sealing effect. When the oil seal ring 7 moves in radial direction, the lips 17 and 18 of the auxiliary seal ring 16a only flex resiliently in the same direction, but the auxiliary seal ring 16a is not twisted. Therefore, the auxiliary seal ring 16a is not damaged during operation of the engine, but performs a sealing effect for a long time.

Since the wavy spring 11b in FIG. 3 is not planar, but linear in manufacture, the bottom portion 21b of the U-shaped auxiliary seal ring 16 is semi-circular so as to correspond to the curved surface of the linear material. The oil seal device 5a in FIG. 3 has the same effect as that of the oil seal device 5 in FIG. 2. Oil seal device 5c in FIG. 4 will now be described in detail. The oil seal ring 7c of the oil seal device 5c is provided with an annular step 22 to one radial side, instead of the annular recess on the rear surface 12 thereof. The lips 17 and 18 of the auxiliary seal ring 16c are sealingly and slidably in contact with the radially inwardly and outwardly facing surfaces 23 and 14, respectively. Since the auxiliary seal ring 16c of the oil seal device 5c may be enlarged in thickness, in comparison with the auxiliary seal rings 16a and 16b in FIGS. 2 and 3 and the wavy spring 11c may also be enlarged and their sealing effect is generally enhanced.

Figure 4:
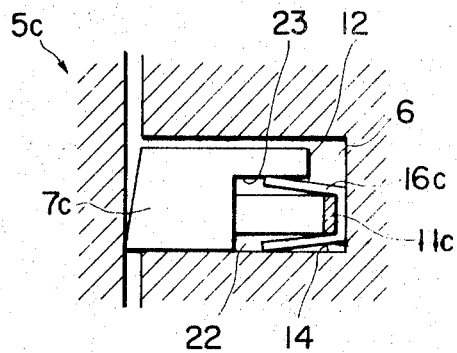
FIG. 4 is a sectional view of another embodiment of the oil seal device of the present invention.
Figure 5:
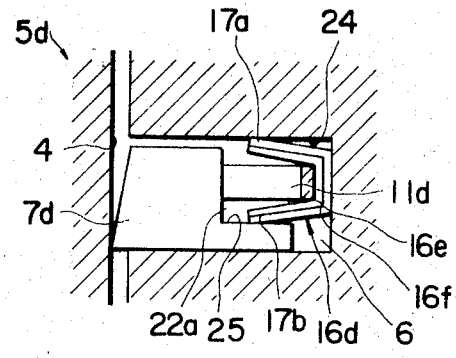
FIG. 5 is a sectional view of another embodiment of the oil seal device of the present invention.

The oil seal device 5d in FIG. 5 is different from the oil seal device 5c in FIG. 4 in the following points: U-shaped auxiliary elastic seal ring 16d has a synthetic resin auxiliary elastic member 16f outside of a metal auxiliary elastic member 16e. This metal auxiliary elastic member 16e has elasticity to press the lips 17a and 17b of the synthetic resin auxiliary elastic member 16f onto the radially inwardly and outwardly facing surfaces 24 and 25 of the annular groove 6 and annular step 22a, respectively. Therefore, the auxiliary seal ring 16d continues to seal between the annular groove 6 and the oil seal ring 7d without damage for long usage of the engine. The auxiliary seal ring cannot prevent the oil seal ring 7d from pressing onto the inner surface 4 of the side housing, and accordingly, the followability of the oil seal ring 7d to the inner surface 4 is very good.

Incidentally, the metal auxiliary elastic member 16e and synthetic resin auxiliary elastic member 16f may not always be constructed as an integral auxiliary seal ring. The auxiliary elastic member 16f of synthetic resin may not always surround all the periphery of the metal auxiliary elastic member 16e. That is, it seals between the annular groove 6 and the oil seal ring 7b with the result that it may only be the construction for preventing gas from flowing from the combustion chamber (not shown) of the engine through the annular groove into the center direction of the rotary piston. For example, even if synthetic resin is coated only on the lip of the metal U-shaped elastic ring, the aims of the present invention may, of course, be performed.

As to the foregoing description, in the oil seal devices of FIGS. 2 to 5, when the oil seal ring moves radially together with the eccentric rotation of the engine, the lips of the auxiliary seal ring follow in the same direction as the oil seal ring in contact with the radially facing surface of the oil seal ring. When the oil seal ring moves, the auxiliary seal ring may not move. Therefore, even if the rotary piston rotates eccentrically peculiar to the rotary piston engine, the auxiliary seal ring may not be twisted nor be damaged. The oil seal ring is not prevented from moving by the auxiliary seal ring, but is directly pressed by the spring axially so that the followability of the oil seal ring to the inner surface of the side housing is very good.

The material of the auxiliary seal ring of the present invention may be of any type, if it performs the objects and effects of the present invention. Synthetic resin rubber or synthetic resin having good refractory and wear resistant properties may be used. Metal material having good refractory and wear resistant properties and resiliency may be used. That is, the auxiliary seal ring 16a may be any of metal material, synthetic resin, or their combination.

The distance between the lips of the auxiliary seal ring is preferably longer than the length of the bottom portion of the auxiliary seal ring. Because the radially outside lip is pressed radially to the outside and the radially inside lip is pressed radially to the inside, and the respective lips are in linear contact with the radially facing surface, they positively prevent oil from leaking without obstructing the movement of the oil seal ring. And, thus, lip contact with the spring is prevented.

What is claimed is:

1. In an oil seal device for rotary piston internal combustion engine comprising a center housing having a trochoidal inner peripheral surface, side housing provided at both sides of said center housing, a multi-apexed rotary piston mounted for movement within the casing formed by said center and side housing, said oil seal device including an oil ring disposed in an annular groove formed on a thrust surface of said rotary piston facing a side housing, the improvement comprising:
   a. said oil seal ring having an annular recess within the rear face thereof facing the bottom of said annular groove,
   b. a U-shaped elastic seal ring with lips at opposed ends disposed in said annular recess,
   c. the lips of said U-shaped elastic sealing ring sealingly contacting opposed radially facing surfaces defined at least partially by said recess,
   d. a spring disposed within said U-shaped elastic seal ring and contacting the bottom face of said recess and said seal ring to press said oil seal ring and said U-shaped elastic seal ring in opposite axial directions.

2. The oil seal device as claimed in claim 1, wherein said recess comprises an annular step provided on a radially outside rear portion of said oil seal ring and said radially facing surfaces comprise a radially facing surface of said recess and a radially facing surface of said annular groove.

3. The oil seal device as claimed in claim 1, wherein said recess comprises an annular step provided on a radially inside rear portion of said oil seal ring and said radially facing surfaces comprise a radially facing surface of said recess and a radially facing surface of said annular groove.

4. The oil seal device as claimed in claim 1, wherein said annular recess lies intermediate of the radially inside and radially outside surfaces of said oil seal ring, and wherein said radially facing surfaces comprise surfaces of the oil seal ring formed by said recess.

5. The oil seal device as claimed in claim 1, wherein said U-shaped elastic seal ring is made of a metallic material.

6. The oil seal device as claimed in claim 1, wherein said U-shaped elastic seal ring is made of a material of synthetic resin or synthetic rubber.

7. The oil seal device as claimed in claim 1, wherein the distance between both lips of said U-shaped elastic seal ring is larger than the length of a bottom portion of said U-shaped elastic seal ring.

8. The oil seal device as claimed in claim 1, wherein said U-shaped elastic seal ring is made of a composite U-shaped metallic member and a U-shaped non-metallic member.

9. The oil seal device as claimed in claim 1, wherein said U-shaped elastic seal ring is made of metal coated with a synthetic rubber material.

10. The oil seal device as claimed in claim 9, wherein said coating material comprises the outer surface of said U-shaped elastic seal ring.

11. The oil seal device as claimed in claim 9, wherein said coating material covers at least the lips and the bottom portion of said U-shaped elastic seal ring.

12. The oil seal device as claimed in claim 1, wherein said U-shaped elastic seal ring is made of metal coated with a synthetic resin.

13. The oil seal device as claimed in claim 12, wherein said coating material comprises the outer surface of said U-shaped elastic seal ring.

14. The oil seal device as claimed in claim 12, wherein said coating material covers at least the lips and the bottom portion of said U-shaped elastic seal ring.

15. The oil seal device as claimed in claim 1, wherein said spring is made of a steel wire.

16. The oil seal device as claimed in claim 15, wherein the bottom portion of said U-shaped elastic seal ring is round to conform to the circular cross section of said steel wire.

* * * * *